(12) United States Patent
Yorks et al.

(10) Patent No.: US 7,181,099 B2
(45) Date of Patent: Feb. 20, 2007

(54) FIBER OPTIC MODULE PACKAGING ARCHITECTURE FOR INTEGRATED CIRCUIT AND OPTICAL SUBASSEMBLY INTEGRATION

(75) Inventors: Jason Yorks, Longmont, CO (US); William Kit Dean, Golden, CO (US); Bob Arnold, Broomfield, CO (US); Blake Mynatt, Broomfield, CO (US)

(73) Assignee: Optical Communication Products, Inc., Woodland Hills, CA (US)

( * ) Notice: Subject to any disclaimer, the term of this patent is extended or adjusted under 35 U.S.C. 154(b) by 39 days.

(21) Appl. No.: 10/787,806

(22) Filed: Feb. 26, 2004

(65) Prior Publication Data

US 2005/0191003 A1    Sep. 1, 2005

(51) Int. Cl.
*G02B 6/12* (2006.01)
*G02B 6/26* (2006.01)

(52) U.S. Cl. .............................. 385/14; 385/15; 385/33; 385/52

(58) Field of Classification Search .................. 385/14
See application file for complete search history.

(56) References Cited

U.S. PATENT DOCUMENTS

| 2004/0022476 A1* | 2/2004 | Kirkpatrick et al. .......... 385/14 |
| 2005/0025434 A1* | 2/2005 | Benner et al. ................ 385/88 |
| 2005/0135732 A1* | 6/2005 | Crow et al. ................... 385/15 |

* cited by examiner

*Primary Examiner*—Frank G. Font
*Assistant Examiner*—Eric Wong
(74) *Attorney, Agent, or Firm*—Barlow, Josephs & Holmes, Ltd.

(57) ABSTRACT

A fiber optic module that includes a packaged integrated circuit chip mounted on a top surface of a printed circuit or other mounting board is disclosed. The integrated circuit chip is electrically coupled to an optical subassembly (OSA) mounted along an edge of the printed circuit board and capable of emitting or receiving light traveling parallel to the printed circuit board. The packaged IC chip is electrically coupled to the OSA through at least one microwave via extending through the board and a conductive trace formed on the opposed bottom surface of the board.

13 Claims, 3 Drawing Sheets

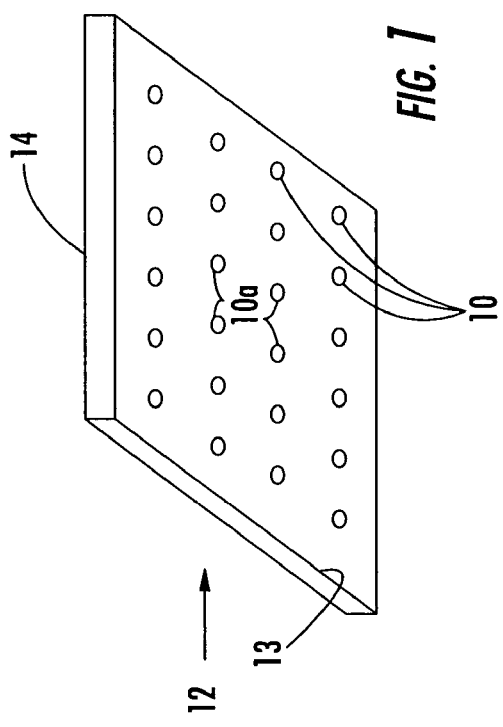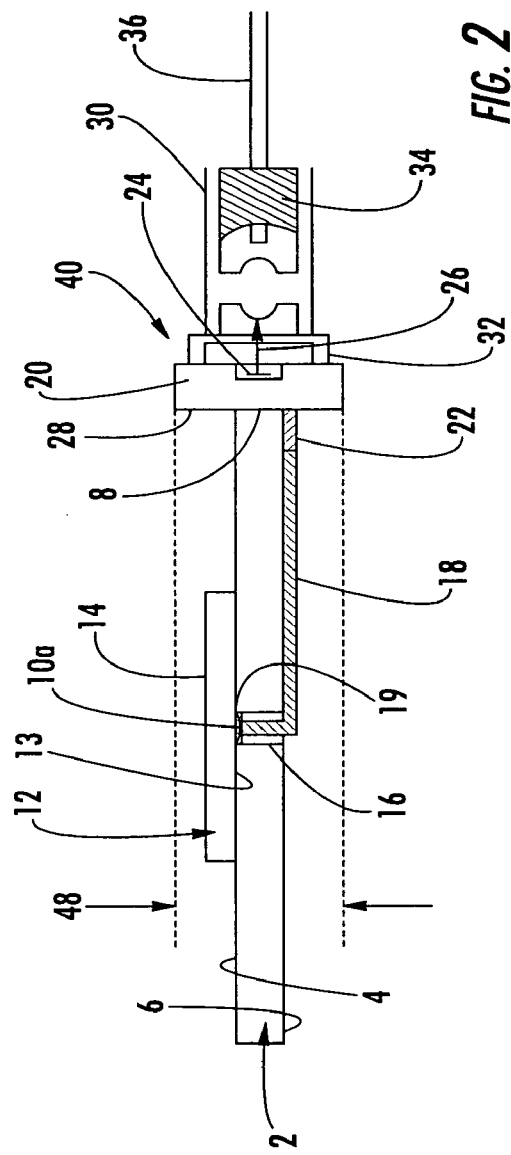

ND OPTICAL SUBASSEMBLY
FIBER OPTIC MODULE PACKAGING ARCHITECTURE FOR INTEGRATED CIRCUIT AND OPTICAL SUBASSEMBLY INTEGRATION

BACKGROUND OF THE INVENTION

The instant invention relates to optoelectronic communication systems. More particularly, the present invention relates to a fiber optic module including an optical subassembly (OSA) coupled to an integrated circuit or other electronic device, by means of a printed circuit board or other mounting device.

In today's rapidly advancing optoelectronic industry, vertical cavity surface emitting lasers (VCSELs) have become preferred as the optical source for providing data signals. VCSELs are favored because of the ease of their manufacture, the repeatability of the manufacturing process used to form VCSELs, the reduced substrate area each VCSEL occupies, and because of the superior uniformity of VCSELs formed within the same substrate. Furthermore, vertical cavity surface emitting lasers typically require less power to drive their lasing action than edge emitting lasers.

One challenge associated with the use of VCSELs in conjunction with fiber optic module packages, is mounting the VCSEL in an optical subassembly (OSA) such that the VCSEL emits light along the fiber launch direction and therefore along the direction of the surface upon which the VCSEL is mounted. A VCSEL may be mounted on the surface such that it emits light orthogonal to the surface and such that mirrors are used to bend the light 90 degrees to try to focus the emitted light onto the end face of a fiber. Such bending of light diminishes the optical coupling efficiency and is undesirable. The optical subassembly including the VCSEL may also be mounted over the surface such that the VCSEL emits light substantially parallel to the surface. This typically involves mounting the VCSEL perpendicular to the surface, and the OSA on or over the surface. In this configuration, the additional components used to monitor the VCSEL and turn the electrical signal 90 degrees, are included in the OSA which is necessarily larger and therefore requires additional vertical space over the surface. There are space constraints in many applications that limit OSA designs, however, and such space constraints limit the vertical space available over a printed circuit board in which to mount an OSA.

It is therefore desirable to reduce the size of the overall module by as much as possible while maintaining the required electrical and optical functionality. In particular, it is desirable to reduce the height by which the OSA extends above the printed circuit board. A typical fiber optic module includes a high speed integrated circuit and OSA mounted on a common printed circuit board. The fiber optic module is desirably formed to a minimum size and optimized for best microwave performance.

There is also an inherent requirement in the art to optimize the thermal heat extraction away from the module subcomponents in order to optimize performance. This can be done if the various components are oriented properly with respect to each other in the overall module housing. In particular, it is desirable to mount a heat generating component such as an integrated circuit, on the top surface of a board or other mounting surface since hot air rises and can more effectively be directed away from other components mounted on or below the board, or otherwise in close proximity.

Another motivation in this field is to increase integration levels and packaging density and to provide a high speed electrical signal path which is as short as possible. It is therefore desirable to have as many electrical input/output (I/O) terminals as possible on an IC (integrated circuit) chip package mounted on a printed circuit board, for example. A ball grid array (BGA) provides such a tightly packed array of multiple I/O terminals on an IC chip package. The individual conductive balls of the BGA are coupled to the actual IC chip by wire bonds and metal traces that are internal to the IC chip package.

Presently, one of the fundamental challenges in forming a microwave optimized, high-speed data path is to route a conductive pathway from a conductive ball that is centrally situated on the BGA of the IC chip package, to an OSA. When such an IC chip package is mounted on a PC board according to conventional arrangements, the centrally situated conductive ball must be routed to the periphery of the BGA and the package, in order to be coupled to a conductive trace formed on the surface of the PC board, that is coupled to the OSA and extends to the periphery of the IC package. This routing may be achieved by forming a conductive path extending through the BGA that is electrically isolated from the other balls in the BGA. One approach for addressing this challenge is to remove balls from the BGA and route a conductive path from the centrally situated conductive ball to the periphery of the BGA, and between the remaining balls of the BGA. This approach undesirably reduces the total I/O terminal count.

This arrangement also limits the amount of freedom in routing the conductive traces of the PC board from the IC package to the OSA because the conductive traces are formed along the top surface of the PC board, which is cluttered with the balls of the BGA that is included on the bottom surface of the IC package which is mounted on the top surface. In order to route the PC board traces along the cluttered top surface of the PC board, this approach favors the use of traces of minimal width. This, in turn, increases skin effect loss, resistance, and impedance. Such increases are detrimental to microwave performance.

It is therefore desirable to provide a fiber optic module which includes an optical subassembly including a VCSEL capable of emitting light substantially parallel to a printed circuit board surface, and such that the fiber optic module occupies a reduced amount of vertical space. It is also desirable to have as many electrical input/output terminals as possible on an IC package while electrically coupling an integrated circuit chip to an optical subassembly using conductive traces optimized for best microwave performance and which include the shortest possible electrical signal path.

BRIEF SUMMARY OF THE INVENTION

In this regard, the present invention provides for a fiber optic module that includes a packaged integrated circuit chip mounted on a top surface of a printed circuit or other mounting board. The integrated circuit chip is electrically coupled to an optical subassembly (OSA) mounted along an edge of the printed circuit board and capable of emitting or receiving light traveling parallel to the printed circuit board. The packaged IC chip is electrically coupled to the OSA through at least one microwave via extending through the board and a conductive trace formed on the opposed bottom surface of the board.

Accordingly, one of the objects is to provide an optimized fiber optic module that requires a reduced amount of space for mounting. Another object of the present invention is the provision of a fiber optic module that includes an OSA that emits and receives light parallel to the base circuit board of the module while optimizing the entire module for high speed or microwave operation. Other objects, features and advantages of the invention shall become apparent as the description thereof proceeds when considered in connection with the accompanying illustrative drawings.

BRIEF DESCRIPTION OF THE DRAWINGS

The following drawings are presented to illustrate the best mode presently contemplated for carrying out the present invention. It is emphasized that, according to common practice, the various features of the drawings are not to scale. On the contrary, the dimensions of the various features are arbitrarily expanded or reduced for clarity. Included are the following figures:

FIG. 1 is a perspective view of an integrated circuit chip package showing a BGA on the lower, mounting surface of the package;

FIG. 2 is a cross-sectional view showing an IC chip package mounted on a printed circuit board and coupled to an optical subassembly according to the present invention;

Figure 3:
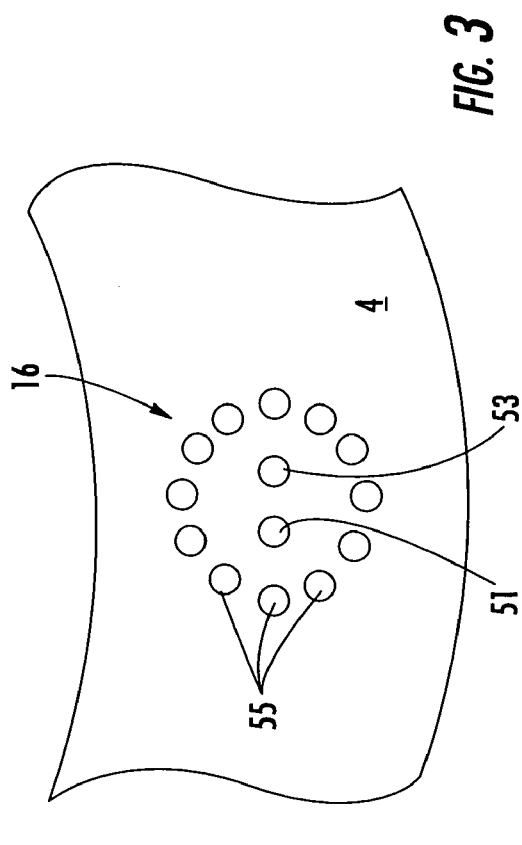
FIG. 3 is a plan view showing an exemplary microwave via according to the present invention.

Like figures denote like features throughout the specification and figures.

DETAILED DESCRIPTION OF THE INVENTION

The present invention provides the advantage that a vertically emitting or vertically detecting optoelectronic device, such as a vertical cavity surface emitting laser (VCSEL) or a vertically receiving photodetector, may be mounted on a mounting board such as a printed circuit board so that the direction of the emitted or received light is substantially parallel to the surface of the printed circuit board. The present invention also provides that the optical subassembly (OSA) that contains the optoelectronic device, is mounted adjacent an edge of the printed circuit board such that the optical subassembly does not take up significant vertical space over the surface of the printed circuit board. The present invention also provides that an integrated circuit chip preferably mounted on the surface of the printed circuit board is electrically coupled to the OSA and the vertically emitting or vertically receiving optoelectronic device, through a signal path which extends through the printed circuit board by means of a microwave via and along a conductive trace formed on the opposed, bottom surface of the printed circuit board. The signal path utilizes microwave vias to extend through the printed circuit board and therefore is not formed exclusively on the top surface. The, IC chip package may be positioned directly over the vias. In this manner, conductive balls of the BGA need not be removed to accommodate routing a pathway from a centrally situated conductive ball of the BGA, to the periphery of the BGA. Moreover, a greater degree of freedom is achieved in routing the conductive traces on the printed circuit board since they need not all be routed on the top surface of the printed circuit board which is congested with the BGA of the mounted IC package and a plurality of traces routed to the IC chip package. A high speed, microwave signal is thereby achieved without significantly reducing the input/output (I/O) count of the BGA and without reducing trace width in response to a congested printed circuit board surface.

Turning now to the figures, an exemplarly embodiment of the principles provided for the present invnation is shown. FIG. 1 is a perspective view of the bottom mounting surface of an exemplary IC chip package 12. IC chip package 12 includes top 14 and an opposed bottom including bottom mounting surface 13. Any of various integrated circuit chips (not shown) may be mounted within a cavity extending between top surface 14 and mounting surface 13, internal to IC chip package 12. In an exemplary embodiment, the IC chips are encapsulated and centrally disposed within IC chip package 12. The IC chip is electrically coupled to conductive balls 10 of the ball grid array BGA formed on bottom mounting surface 13 of IC chip package 12. The IC chip is electrically coupled by wire bonds (not shown), to conductive traces within IC package 12, that are in turn routed to and in electrical communication with the conductive balls 10 of the BGA.

Several of these traces may terminate in a conductive ball 10a that is centrally situated within the BGA and opposite the centrally disposed IC chip. The term "ball" is intended to be illustrative only and other conductive bumps and shapes may form the conductive features of the exemplary BGA such as shown on bottom mounting surface 13 of IC package 12. Conductive balls 10 may be formed of conventional conductive materials such as solder preform. The BGA shown in FIG. 1 is intended to be exemplary only.

According to the prior art, the centrally located balls 10a of the BGA are routed to the periphery of the BGA through a pathway which is formed at the expense of balls 10 of the BGA and extends through the remaining conductive balls 10 of the BGA. The individual balls 10 of the BGA each serve as individual input/output (I/O) terminals. As such, by removing balls 10 of the BGA, the number of I/O terminals is reduced. In the prior art arrangement, the conductive traces which extend to the OSA, are formed on the cluttered top surface of the printed circuit board (PCB), on which the BGA of the IC package, is directly mounted.

FIG. 2 shows a cross-sectional view of exemplary fiber optic module packaging architecture according to the present invention. FIG. 2 shows IC package 12 mounted on top surface 4 of printed circuit board 2. Printed circuit board 2 is intended to be exemplary only. Other suitable mounting boards besides conventional PCBs may be used according to other exemplary embodiments, but the mounting board will hereinafter be referred to simply as PCB 2 or printed circuit board 2. PCB 2 also includes opposed, bottom surface 6. Bottom mounting surface 13 of IC package 12 may be mounted over, or directly on, top surface 4. It should be understood that IC package 12 may include any of various integrated circuit or other semiconductor device chips encapsulated therein or thereon. Top surface 4 may include a plurality of conductive traces and other components (not shown) formed thereon. PCB 2 further includes peripheral edge 8.

IC package 12 is advantageously mounted on top surface 4 since heat may be generated during the operation of the circuits within IC package 12, and can more easily be conducted away in this configuration, as the natural tendency is that hot air rises vertically. Optical subassembly (OSA) 40 is mounted adjacent peripheral edge 8. OSA 40 may be mounted adjacent peripheral edge 8 using methods and structures known in the art, such as described in U.S.

provisional application No. 60/304,925, entitled Edge Mount, Leaded Ceramic Optical subassembly, filed on Jul. 11, 2001, the contents of which are herein incorporated by reference. Exemplary OSA 40 includes exemplary ceramic carrier 20 which preferably includes a cavity covered by glass cover 32 and which is attached to ferrule housing 30. Ferrule 34 contains optical fiber 36 and is preferably secured within ferrule housing 30.

Secured within ceramic carrier 20 is exemplary VCSEL 24 which preferably emits light 26 along the direction substantially parallel to top surface 4 and bottom surface 6 of printed circuit board 2. Conductive pins 22 preferably extend orthogonally from any of various locations on base surface 28 of ceramic carrier 20. Base surface 28 is mounted substantially orthogonal to top surface 4. Ceramic carrier 20 may include additional conductive or non-conductive mounting pins joined to either or both of top surface 4 and bottom surface 6 to provide mechanical stability.

It should be emphasized that OSA 40 is intended to be exemplary only and may vary according to other exemplary embodiments. Various alternative suitable arrangements of the various components may be used. OSA 40 may include carriers other than ceramic carrier 20 as in the exemplary embodiment. VCSEL 24 is intended to be exemplary only and various other optical sources or vertically receiving optical devices may be used alternatively. According to one exemplary embodiment as will be shown in FIG. 4, multiple optical subassemblies may be mounted adjacent the edge of printed circuit board 2. Various additional or alternative components may be included within exemplary optical subassembly 40. Optional glass cover 32 may or may not be used in other exemplary embodiments. OSA 40 is mounted such that the vertically receiving optical element or the vertically emitting optical element preferably receives or emits light which propagates along optical fiber 36 which preferably includes a fiber launch direction parallel to top surface 4 and bottom surface 6. The emitting or receiving face of the vertically emitting or vertically receiving optical element is preferably oriented orthogonal to top surface 4.

OSA 40, PCB 2 and IC package 12 combine to form a fiber optic module which includes an overall height 48 which is considerably reduced compared to the alternative arrangement in which OSA 40 is positioned over top surface 4 of printed circuit board 2 as is normally the case in prior art assemblies. OSA 40 is mounted such that portions of OSA 40 extend above top surface 4 and other portions of OSA 40 extend below bottom surface 6. The components of IC package 12 are electrically coupled to the components of OSA 40 by means of at least one signal path such as the exemplary one shown in FIG. 2. The exemplary signal path includes an internal path within IC package 12 that couples the IC chip to a conductive ball of the BGA such as conductive ball 10 illustrated in FIG. 2. The exemplary signal path travels through microwave via 16 and conductive trace 18 formed on bottom surface 6. Microwave via 16 is formed of a conductive material and preferably extends from top surface 4 to bottom surface 6, and therefore through printed circuit board 2. Microwave via 16 terminates superjacently at a location on top surface 4 of PCB 2 which may include a metallic pad 19 formed thereon. Metallic pad 19 electrically contacts a conductive bump 10 of the BGA. In an exemplary embodiment, conductive bump 10 may be aligned directly over metal pad 19 and formed of solder preform which is heated to cause conductive bump 10 to reflow and form a contact with metal pad 19. Since microwave via 16 electrically couples IC package 12 to OSA 40, it is considered a live, or active via. The electrical signal path shown is exemplary only and generally speaking, a plurality of such electrical signal paths will be formed to electrically couple multiple conductive balls 10 of IC package 12, to OSA 40 through traces formed along bottom surface 6. According to other exemplary embodiments, the signal path may additionally include other conductive traces. Lower conductive trace 18 is preferably coupled to a conductive pin 22. This coupling may be achieved by soldering or other conventional means. In a preferred embodiment, multiple conductive pins 22 are used. Conductive pins 22 are electrically coupled to the various optoelectronic components within OSA 40, such as an exemplary VCSEL or a vertically receiving device.

The architecture of the present invention includes the use of lower conductive traces 18 that travel along bottom surface 6 of PCB 2. This creates additional space on top surface 4 of PCB 2 which is less congested and may be used for other components, additional traces and a grounding scheme. The ball grid formed on bottom mounting surface 13 of IC package 12 may include a plurality of conductive balls 10 available as I/O terminals. In some cases, all of the conductive bumps 10 may be used to provide electrical connection. In other cases, not all of the conductive bumps may be utilized for electrical coupling. A plurality of conductive vias are formed to extend through printed circuit board 2. Generally speaking, each conductive microwave via terminates in a superjacent metallic pad 19. If the via 16 is coupled to an active conductive ball 10, it is considered an active, or live via that carries an electrical signal and will be further coupled to a conductive trace such as conductive trace 18 formed on bottom surface 6.

FIG. 3 shows a plan view of an exemplary microwave via 16. In an exemplary embodiment, microwave via 16 includes two conductive leads, 51 and 53, arranged in parallel and including a differential voltage. The respective conductive leads 51 and 53 preferably carry differential voltage signals. Surrounding conductive leads 51 and 53 are a plurality of ground or reference leads 55. Ground or reference leads 55 are grounded in an exemplary embodiment. Conventional conductive materials such as copper, gold, nickel and other metals may be used to form the various leads which collectively form microwave via 16. Each of the conductive leads 51 and 53 are electrically insulated from one another and from each of ground or reference leads 55. Other suitable arrangements of the various leads of microwave 16 may be used in alternative embodiments.

Figure 4:
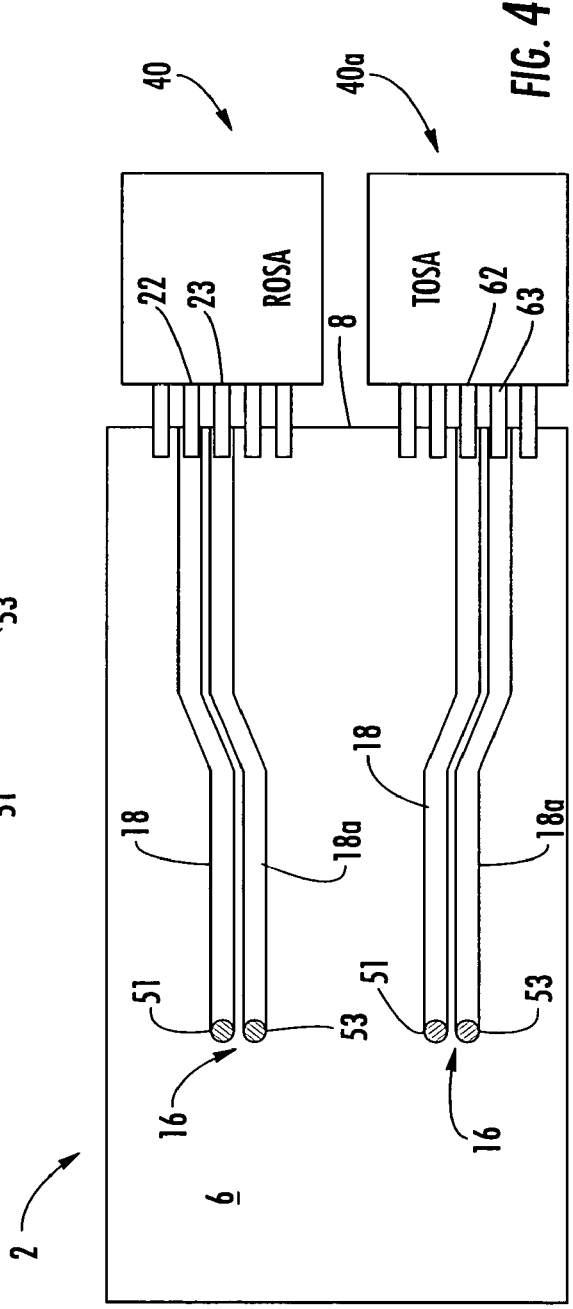
FIG. 4 is a plan view of an exemplary bottom surface of a printed circuit board according to the present invention.

FIG. 4 is a plan view of an exemplary bottom surface 6 of PCB 2. Exemplary conductive traces 18,18a extend from conductive leads 51 and 53 of microwave via 16 to edge 8 where they are connected to exemplary conductive pins 22, 23 of the TOSA and ROSA. The two illustrated conductive traces 18, 18a are examples of the multiple conductive traces 18 which are routed along bottom surface 6 to provide signal paths from the OSA 40 to the IC chip package 12. According to the present invention, conductive traces 18, 18a may be routed any of various ways to edge 8 of printed circuit board 2 such that the conductive traces 18, 18a are electrically coupled to the conductive mounting pins 22, 23 such as exemplary conductive pins 22, 23 which may be joined to bottom surface 6 by soldering or various mechanical means. According to the exemplary arrangement shown in FIG. 4, each of a receive OSA 40 (ROSA) and a transmit OSA 40a(TOSA) are joined to peripheral edge 8 of PCB 2. Other arrangements may be used according to other exemplary embodiments.

Figure 5:
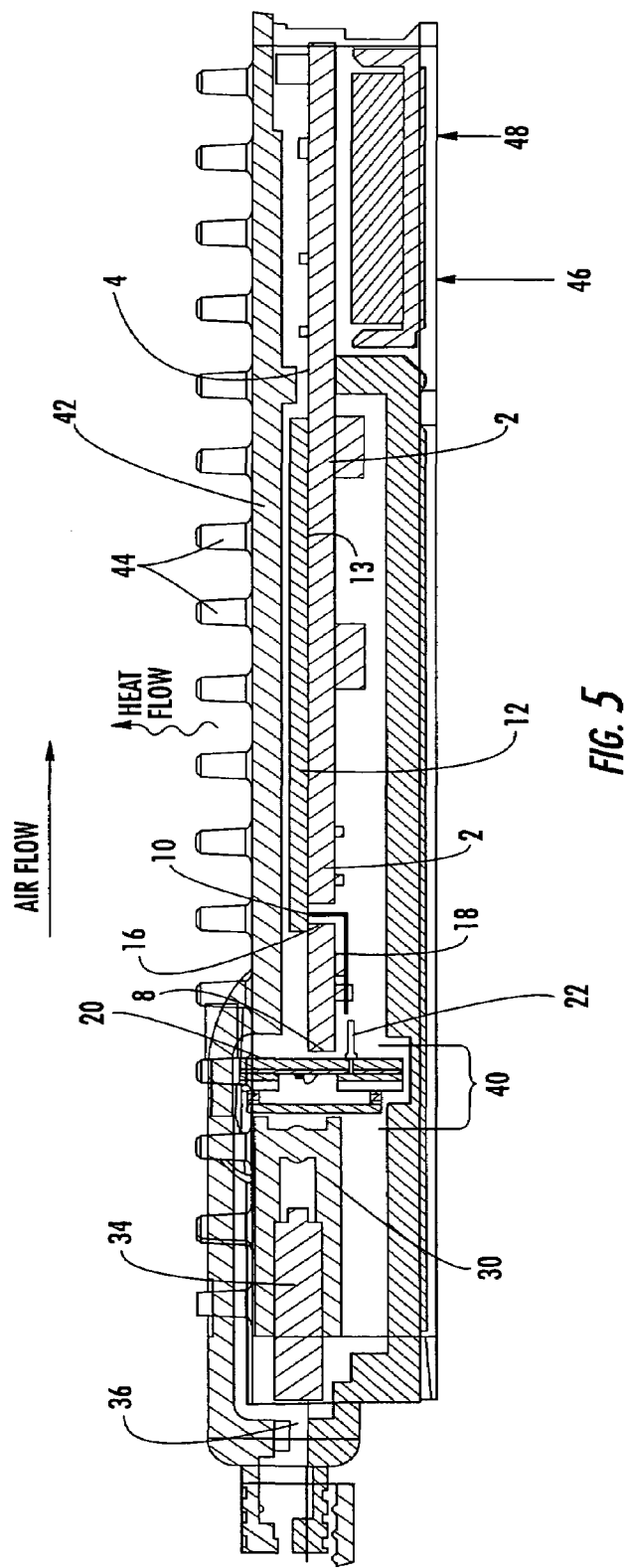
FIG. 5 is a cross-sectional view showing a fiber optic module of the present invention assembled within a housing.

FIG. 5 shows an exemplary arrangement of the fiber optic module packaging architecture of an exemplary embodiment. FIG. 5 shows PCB 2 including IC package 12 joined to OSA 40 such as shown and described in conjunction with FIG. 2. In the exemplary embodiment shown in FIG. 5, IC package 12 is formed over microwave via 16 and includes conductive ball 10 aligned over and electrically coupled to microwave via 16. In this manner, conductive traces are not needed on top surface 4, to route the electrical signal path from IC package 12 to OSA 40. IC package 12 is electrically coupled to OSA 40 through microwave via 16, conductive trace 18 and conductive pins 22 as described in conjunction with FIG. 2. The combination of PCB 2 and OSA 40 forms a fiber optic module which is positioned within enclosure or housing 42. IC package 12 is advantageously mounted on top surface 4 so that any heat which may be generated during the operation of the semiconductor component or components within IC package 12, will rise and preferably be carried away from the fiber optic module by air flowing above enclosure 42. Enclosure 42 includes heat fins 44 to maximize surface area of enclosure 42 and effectuate rapid heat dispersion. Because of the arrangement of OSA 40 and ceramic carder 20 adjacent edge 8 of printed circuit board 2, resulting in overall height 48, the vertical spacing requirement of the PCB 2/OSA 40 arrangement is minimized and enclosure 42 may correspondingly include height 46 which is of similarly reduced dimension by eliminating fins 44. This advantageously allows for an increased number of fiber optic modules to be included within a user's assembly.

It can therefore be seen that the present invention provides a compact optical module that includes an edge mounted OSA n40 whereby the input/output signal can be received directly parallel with the plane of the module substrate 2 while also providing high speed interconnectivity with an IC package 12 mounted thereon. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A reduced thickness fiber optic module comprising:
   a printed circuit board having a top surface, a bottom surface and a peripheral edge surface extending between said top and bottom surfaces;
   an integrated circuit chip package including a bottom mounting surface mounted on said top surface, said mounting surface including a plurality of conductive features formed thereon;
   at least one microwave via formed through said printed circuit board and extending from said top surface to said bottom surface, each via containing a conductive material therein and a first via coupled to a first conductive feature of said plurality of conductive features; and
   an optical subassembly (OSA) having a carrier substrate including a front side and a back side, said back side of said OSA carrier substrate mounted in closely spaced adjacent relation with said peripheral edge surface such that a portion of said carrier substrate resides above said top surface and a portion of said carrier substrate resides below said bottom surface, said optical sub assembly electrically coupled to a lower conductive trace formed on said bottom surface, said lower conductive trace electrically coupled to said first via, said OSA electrically coupled to said first via and therefore to said first conductive feature.

2. The fiber optic module of claim 1, wherein said OSA includes an optical source that emits light in a direction substantially parallel to said top surface.

3. The fiber optic module of claim 1, wherein said OSA includes a vertical cavity surface emitting laser (VCSEL) therein, said VCSEL capable of emitting light in a direction substantially parallel to said top surface and generally perpendicular to a base surface of said OSA.

4. The fiber optic module of claim 3, wherein said base surface is mounted generally perpendicular to said printed circuit board and includes a plurality of pins extending orthogonally therefrom, at least one of said pins being conductive and electrically coupled to said lower conductive trace.

5. The fiber optic module of claim 1, wherein said OSA includes a vertical cavity surface emitting laser (VCSEL) therein capable of emitting light in a direction generally parallel to said top surface and generally perpendicular to a base surface of said OSA, said base surface including a plurality of pins extending therefrom and mechanically coupled to one of said top surface and said bottom surface.

6. The fiber optic module of claim 1, wherein said first conductive feature is electrically coupled to said integrated circuit chip of said integrated circuit chip package.

7. The fiber optic module of claim 1, wherein said optical subassembly includes a receive optical element therein and a base surface mounted generally perpendicular to said printed circuit board, said optical subassembly including portions extending both above said top surface and below said bottom surface.

8. The fiber optic module of claim 1, wherein said first conductive feature is mounted directly over said first microwave via.

9. The fiber optic module of claim 1, wherein said plurality of conductive features comprises a ball grid array.

10. The fiber optic module of claim 1, wherein each microwave via includes a duality of conductive paths extending through said printed circuit board and a plurality of ground paths extending through said printed circuit board and peripherally surrounding said duality of conductive paths.

11. A reduced thickness fiber optic module comprising:
    a printed circuit board having a top surface, a bottom surface and a peripheral edge surface extending between said top and bottom surfaces;
    an integrated circuit chip package including an integrated circuit chip encapsulated therein, and a bottom surface including a ball grid array of conductive balls formed thereon, said bottom surface mounted on said top surface;
    a conductive microwave via extending through said printed circuit board from said top surface to said bottom surface, terminating at a first location of said top surface and contacting a first ball of said ball grid array, and further terminating at a lower conductive trace formed on said bottom surface; and
    an optical subassembly having a carrier substrate including a front side and a back side, said back side of said optical subassembly carrier substrate mounted in closely spaced adjacent relation with said peripheral edge surface such that a portion of said carrier substrate resides above said top surface and a portion of said carrier substrate resides below said bottom surface, said optical sub assembly including a vertical cavity surface emitting laser (VCSEL) capable of emitting light along a direction substantially parallel to said top surface, and electrically coupled to said lower conductive trace, said integrated circuit chip electrically coupled to said first ball.

12. The fiber optic module of claim 11, wherein said VCSEL includes an emitting surface which is substantially orthogonal to said top surface.

13. The fiber optic module of claim 11, wherein said top surface of said printed circuit board includes a plurality of metallic pads formed thereon and including a metallic pad disposed at said first location.

* * * * *